United States Patent
Chauvin et al.

(10) Patent No.: US 10,308,992 B2
(45) Date of Patent: Jun. 4, 2019

(54) METHOD AND SYSTEM FOR SELECTIVELY SOFTENING HOT STAMPED PARTS BY INDUCTION HEATING

(71) Applicant: Ford Motor Company, Dearborn, MI (US)

(72) Inventors: Kevin Robert Chauvin, Farmington Hills, MI (US); Garret Sankey Huff, Ann Arbor, MI (US); Constantin Chiriac, Windsor (CA); Raj Sohmshetty, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 822 days.

(21) Appl. No.: 14/830,800

(22) Filed: Aug. 20, 2015

(65) Prior Publication Data

US 2017/0051371 A1  Feb. 23, 2017

(51) Int. Cl.
| | |
|---|---|
| *H05B 6/14* | (2006.01) |
| *C21D 1/42* | (2006.01) |
| *C21D 9/32* | (2006.01) |
| *C21D 9/00* | (2006.01) |
| *C21D 11/00* | (2006.01) |

(52) U.S. Cl.
CPC .............. *C21D 1/42* (2013.01); *C21D 9/0068* (2013.01); *C21D 11/00* (2013.01); *Y02P 10/253* (2015.11)

(58) Field of Classification Search
CPC ........ C21D 1/42; C21D 9/0068; C21D 11/00; Y02P 10/253
USPC ........ 219/600, 640, 653, 656, 662; 148/320, 148/639, 644, 643, 654, 661, 567; 266/125, 129
See application file for complete search history.

(56) References Cited

U.S. PATENT DOCUMENTS

| | | | |
|---|---|---|---|
| 4,855,556 A * | 8/1989 | Mucha | C21D 9/32 219/640 |
| 6,815,650 B1 | 11/2004 | Bartz | |
| 6,965,098 B2 | 11/2005 | Bartz | |
| 7,041,946 B2 | 5/2006 | Bartz | |
| 7,286,893 B1 | 10/2007 | Mazumder | |

(Continued)

FOREIGN PATENT DOCUMENTS

| | | |
|---|---|---|
| CN | 2839299 | 11/2006 |
| CN | 101742747 | 6/2010 |

(Continued)

OTHER PUBLICATIONS

First Office Action for CN201610700866.2, Prepared by National Intellectual Property Administration, PRC, dated Jan. 17, 2019, 10 pgs.

*Primary Examiner* — Quang T Van
(74) *Attorney, Agent, or Firm* — Raymond L. Coppiellie; Brooks Kushman P.C.

(57) ABSTRACT

A method and system are disclosed for treating a press hardened part by induction heating localized areas of the part to have reduced hardness. The method and system monitor an ambient temperature, cycle time, outgoing part property requirements, and outgoing part hardness in local areas. A time value and temperature value are set by a computer system for a plurality of induction heaters. A local area of the part is induction heated to soften the part in localized areas. The hardness of the localized areas is tested after induction heating.

16 Claims, 2 Drawing Sheets

(56) References Cited

U.S. PATENT DOCUMENTS

| | | | |
|---|---|---|---|
| 7,678,213 B1* | 3/2010 | Loen | B32B 15/08 |
| | | | 156/259 |
| 8,801,873 B2* | 8/2014 | Miyanishi | C21D 1/06 |
| | | | 148/319 |
| 9,162,304 B2 | 10/2015 | Martin | |
| 9,409,221 B2 | 8/2016 | Kobayashi | |
| 2006/0137779 A1* | 6/2006 | Brodt | B21D 35/00 |
| | | | 148/567 |
| 2007/0163683 A1 | 7/2007 | Schiessl | |
| 2016/0113069 A1* | 4/2016 | Haimer | B23B 31/1179 |
| | | | 219/635 |

FOREIGN PATENT DOCUMENTS

| | | | |
|---|---|---|---|
| CN | 202450130 | 9/2012 | |
| CN | 102740520 | 10/2012 | |
| CN | 102985207 | 3/2013 | |
| CN | 203462079 | 3/2014 | |
| CN | 104165402 | 11/2014 | |
| DE | 102005005892 A1 * | 8/2006 | ......... B23B 31/1179 |
| EP | 2407564 A1 * | 1/2012 | ............... C21D 1/10 |

* cited by examiner

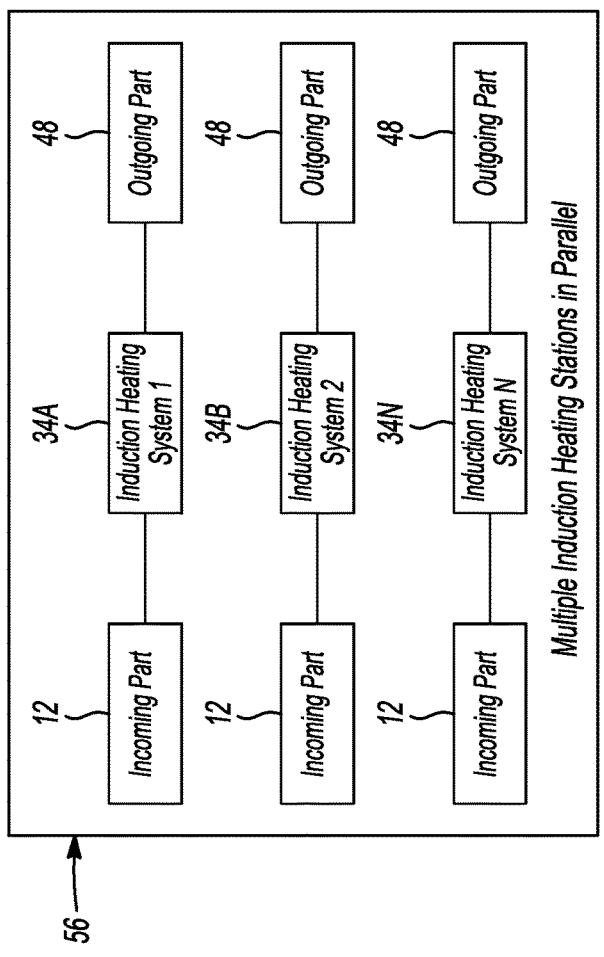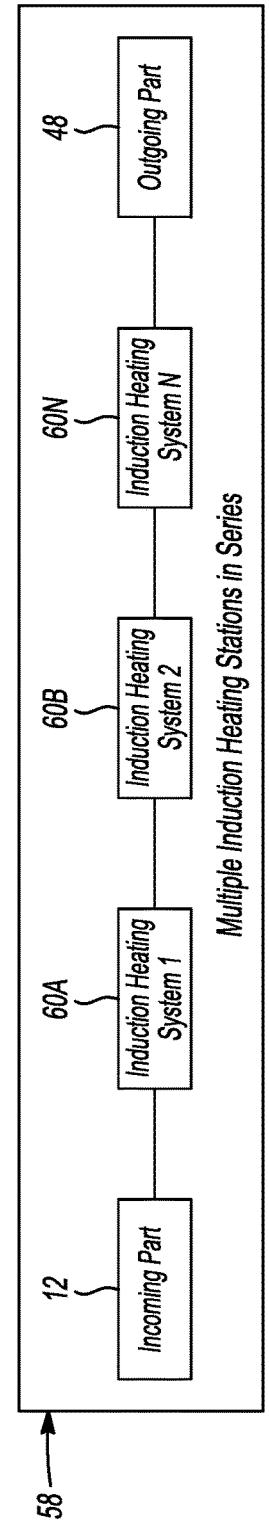

METHOD AND SYSTEM FOR SELECTIVELY SOFTENING HOT STAMPED PARTS BY INDUCTION HEATING

TECHNICAL FIELD

The disclosure relates to a system and method of manufacturing hot stamped steel parts to include areas that are induction heated to soften selected areas to receive fasteners.

BACKGROUND

Press hardened steel alloys are being used for sheet metal parts incorporated in vehicle body structures that may be assembled together with rivets. One example of a press hardened steel is cold rolled boron steel sold under the designation Docol® 22MnB5. Press hardened steel can be water cooled or oil cooled to desired level of hardness from 450 to 520 HV. Press hardened steel may be annealed to reduce the hardness to 140 HV.

Press hardened steel parts may be assembled to other steel parts by welding. However, new automotive assemblies may include combinations of parts made of different materials such as aluminum and composite parts. A press hardened Ultra High Strength Steel (UHSS) beam and a composite part or an aluminum part cannot be efficiently joined together in a welding operation. The preferred technique for joining such part assemblies is to rivet or otherwise fasten the parts together. The hardness of such high strength parts poses significant challenges in high volume manufacturing operations because the rivets have difficulty penetrating the press hardened UHSS beam.

Press hardened UHSS parts may also be used to manufacture controlled energy absorption applications but the high hardness and tensile strength of the parts prevents substantial energy absorption.

One approach to solving the above problems is to locally soften the part while in the hot stamping die. However, locally softening of the part while disposed in the hot stamping die is unreliable because it is difficult to control all of the process variables in the hot stamping die.

This disclosure is directed to solving the above problems and other problems as summarized below.

SUMMARY

According to one aspect of this disclosure, a method is disclosed for making a press hardened part with induction heated localized areas having lower hardness. The method includes monitoring an ambient temperature, system inputs including cycle time and outgoing part property requirements, outgoing part hardness in local areas, and at least one table of material properties. Time values and temperature values are set for a plurality of induction heaters. A local area of the part is induction heated and the hardness of the local area of the part is determined after induction heating.

According to other aspects of this disclosure, the method may further comprise determining a temperature distribution of the part following a hot stamping operation and prior to induction heating. The method may further comprise thermally imaging the part following induction heating.

According to another aspect of the method, a material property of the outgoing part (e.g., tensile strength or yield strength) is converted to a hardness value that is provided to a computer system that sets the time value and temperature value for the induction heaters for subsequent parts.

According to another aspect of this disclosure, the method may further comprise measuring a material property of a part during induction heating providing a real-time in process temperature distribution data. The real-time in process temperature distribution data is provided to a computer system that sets the time value and temperature value for the induction heaters.

According to a further aspect of this disclosure, the table of material properties may include a table of tempering curves, a table of material properties, and a strength-to-hardness conversion table.

In one embodiment, the plurality of induction heaters may be arranged in parallel with each other and the step of induction heating may be performed simultaneously on a plurality of parts. In an alternative embodiment, the plurality of induction heaters may be arranged in series and the step of induction heating may be performed sequentially by incrementally heating the part.

According to another aspect of this disclosure, a system is disclosed for locally softening a press hardened part. The system comprises an induction heater, an ambient temperature sensor, an interface for setting a cycle time and a desired part property corresponding to a hardness value in a local area, and a controller. The controller sets a time value and a temperature value for the induction heater based upon an ambient temperature, the cycle time, the desired part property, and the hardness value in the local area.

According to other aspects of this disclosure as it relates to the system, at least one table of material properties may be used to provide hardness information relating to the part to the controller. The system including the induction heater may further comprise a plurality of induction heaters arranged in parallel with each other. The induction heaters simultaneously heat a plurality of parts. Alternatively, the system may include a plurality of induction heaters arranged in series for sequentially and incrementally heating the part. The ambient temperature sensor may be a thermal imaging camera.

According to another aspect of the system for locally softening sheet metal parts, the system may include a controller that receives a temperature of the parts, production rate data, desired part property data, and feedback data regarding a physical property test. An induction heater may be used that receives control signals from the controller setting a desired temperature and a desired time for induction heating the parts.

The above aspects of this disclosure and other aspects are described below with reference to the attached drawings.

BRIEF DESCRIPTION OF THE DRAWINGS

FIG. 2 is a flowchart of an induction heating manufacturing process with a plurality of induction heating systems arranged for parallel processing of parts.

FIG. 3 is a flowchart of an induction heating manufacturing process with a plurality of induction heating systems arranged for series processing of parts.

DETAILED DESCRIPTION

Figure 1:
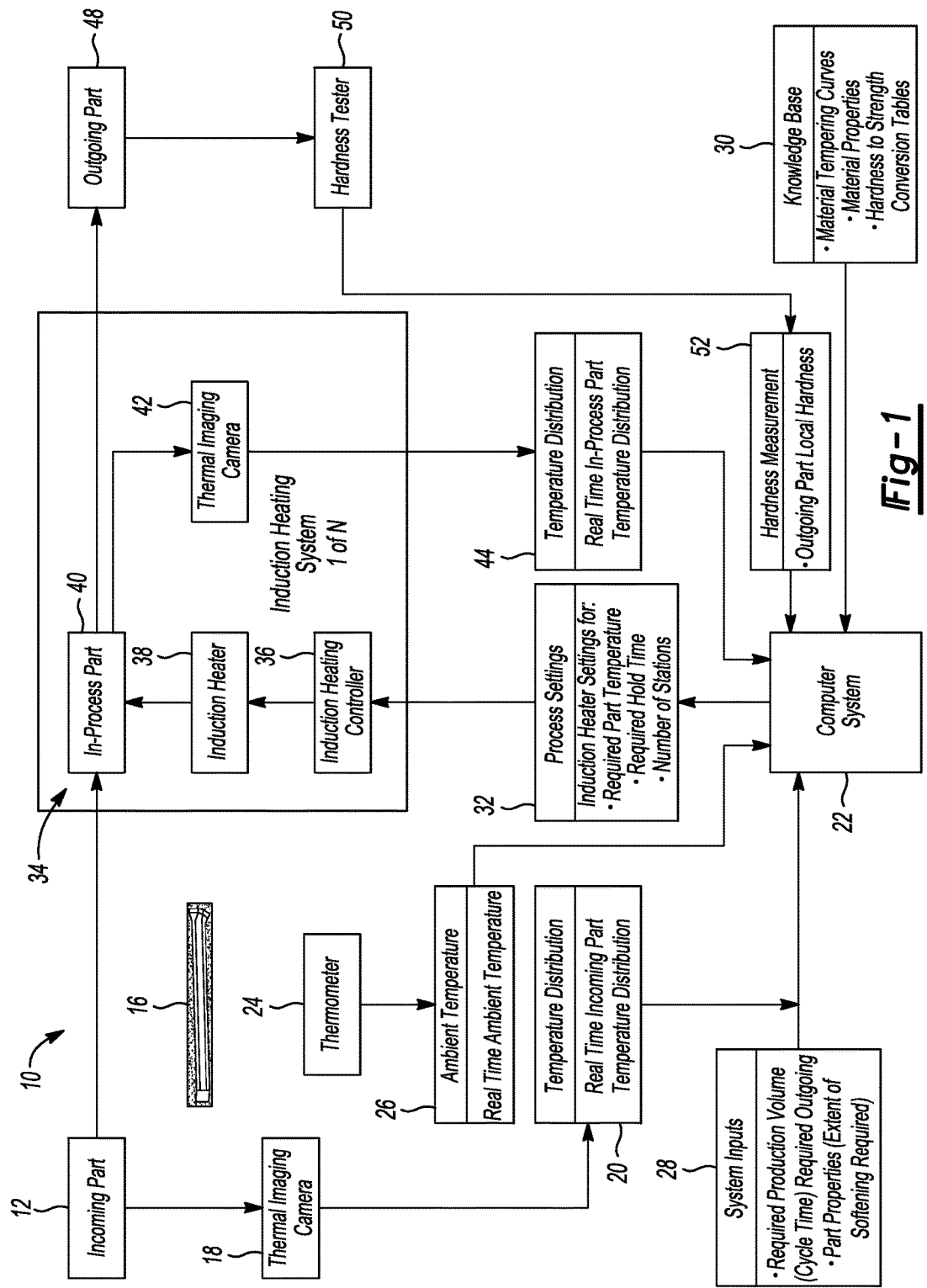
FIG. 1 is a flowchart illustrating one embodiment of a system for locally softening hot stamped parts in a manufacturing process.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a flowchart is provided to illustrate the steps of a system 10 for local softening of hot stamped parts in a high volume manufacturing operation. An incoming part 12 may be a part from storage or may be a part received from a hot stamping line. The incoming part 12, for example, may be an ultra-high strength steel (UHSS) beam 16 that may be used as a reinforcement for a door.

If the incoming part 12 is received directly from a hot stamping line with residual heat, the temperature of the part may be determined by a thermal imaging camera 18. Alternatively, the temperature profile of the part 12 may be determined by a thermistor, or the like, instead of a thermal imaging camera 18. In either event, temperature distribution data is compiled at 20. The temperature distribution data provides real time incoming part temperature distribution data for the part at various locations and, in particular, in locations where the part is to be induction heated for softening. The temperature distribution data at 20 is provided to a computer control system 22. The computer control system 22 may be a general purpose computer programmed according to the algorithm illustrated by the flowchart of FIG. 1, or may be a programmable controller used in manufacturing systems.

A thermometer 24 may be used to provide real time ambient temperatures that are compiled at 26 and provided to the computer system 22. Ambient temperature is monitored by the system to provide a base line for thermal treatment of the incoming part 12.

System inputs at 28 are provided to the computer system 22 including the required production volume that may be expressed in terms of cycle time and the properties required for outgoing parts, for example, the hardness or extent of softening required to be obtained by the system for locally softening parts 12.

The computer system 22 is also provided with engineering data from a knowledge base 30. The knowledge base 30 may include lookup tables that provide material tempering curves, material properties, or hardness to strength conversion tables.

Based upon the incoming temperature distribution data 20, ambient temperature data 26, system input parameters 28 and knowledge base 30, the computer system 22 determines process settings such as the induction heating settings for the required part temperature the required hold time for locally softening hot stamped parts. The computer system 22 sets process settings at 32 for an induction heating controller 36. The induction heating controller 36 controls the induction heater 38. It should be noted that according to this disclosure, a plurality of induction heaters 38 may be provided to reduce the time necessary to locally soften the in-process part 40.

After induction heating, the in-process part 40 may be thermally imaged by a thermal imaging camera 42. The thermal imaging camera 42 may be used to provide real time in-process part temperature distribution data at 44. The temperature distribution data compiled at 44 is provided to the computer system 22 to provide real time data upon which the computer system 22 may adjust the required part temperature or required hold time. The in-process part 40 is transferred from the induction heating system 34 after induction heating is completed and the in-process part 40 may be referred to as an outgoing part 48. The outgoing part 48 is an UHSS part that includes locally softened areas that are softened after the hot stamped parts are formed. The outgoing part 48 is tested to determine the hardness of the outgoing part 48. The outgoing part 48 is tested by a hardness tester at 50 for future reference and for on-line, real time adjustment of the induction heating process settings.

Referring to FIG. 2, an induction heating system 34 is shown that includes a plurality of induction heating systems arranged in parallel on-line. Incoming parts 12 are transferred by a material handling system to a plurality of induction heating systems 34A, 34B, and 34N. The induction heating process is performed in a single step in the embodiment of FIG. 2. The parts are heated by induction heating and held at a desired temperature for locally softening portions of the incoming part over time. For example, the system may heat the localized area of the incoming part 12 to a temperature of between 700° and 870° C. The part is held for a predetermined period of time to soften the incoming part 12. The time required for induction heating is substantial. The time required may be 10 to 20 seconds at a high temperature (e.g., 870° C.) or at lower temperatures (e.g., 700° C.) may require 40 to 60 seconds. A plurality of induction heating systems 34A-34N may be provided to match the desired cycle time. An incoming part may be directed to an induction heating system 34 while other incoming parts are being processed on other induction heating systems that are in a parallel arrangement. The number of on-line induction heating systems may be selected to decrease the cycle time. Additional induction heating system capacity may be added or may be reduced to achieve the desired cycle time. One or more of the induction heating systems 34A-34N may be deactivated or reactivated, as needed to meet production requirements. In the embodiment of FIG. 2, after induction heating, the part is removed from the induction heating system 34 and is processed as an outgoing part 48 as previously described with reference to FIG. 1.

Referring to FIG. 3, a series processing induction heating process 58 is illustrated for induction heating an incoming part 12 to locally soften the part. The incoming part 12 is processed in a series of induction heating systems 60A, 60B to 60N. The induction heating systems 60 each heat the incoming part 12 to a desired temperature. For example, the induction heating system at 68 may heat an incoming part 12 to 400° C. before transferring the part to an induction heating system 60B that heats the part to 500° C. This process of incrementally heating the part continues until induction heating system 60N that heats the part to 700° C. Less time is required to heat the part at each stage to a desired temperature for softening localized areas of the outgoing part 48.

Softening a part using induction heating can be achieved by either high temperatures and low time, or low temperatures over a long period of time. If a part is softened using a high temperature for a limited period of time, increased variability may be encountered as to the extent of softening. Softening utilizing high temperatures also creates a risk of eventual re-austenization of the part and may result in hardening the part instead of softening. The system 10 controls the temperature and time of the induction heating process to assure that the part is softened.

If the system 10 for locally softening part is provided in-line with a hot stamping tool, the output of the plurality of induction heating system 34 should be matched to the cycle time of the hot stamping tool. Due to the thermodynamics and kinetics involved with heat treating metals, in this case, high UHSS materials, different approaches may be used to achieve the target properties that may be expressed in terms of hardness or yield strength.

Induction cells arranged in series each increase the temperature of the part by a set increment. On the other hand, induction cells arranged in parallel process multiple parts at the same time on separate induction heating systems so that the cumulative number of parts produced meet the cycle time requirements.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of treating a press hardened part comprising:
   monitoring an ambient temperature, system inputs including cycle time and outgoing part property requirements, outgoing part hardness in local areas, and at least one table of material properties;
   setting a time value and temperature value for a plurality of induction heaters;
   induction heating a local area of the part;
   determining outgoing part hardness of the local area of the part after induction heating; and
   measuring a material property of the outgoing part and converting the measurement of the material property to a hardness value;
   providing the hardness value to a computer system; and
   setting the time value and temperature value for the induction heaters for a subsequent part.

2. The method of claim 1 further comprising:
   determining a temperature distribution of the part following induction heating.

3. The method of claim 1 further comprising:
   determining a temperature distribution of the part following a hot stamping operation and prior to induction heating.

4. The method of claim 1 further comprising:
   imaging the part thermally following induction heating.

5. The method of claim 1 further comprising:
   imaging the part thermally following a hot stamping operation and prior to induction heating.

6. The method of claim 1 wherein the at least one table of material properties includes:
   a table of tempering curves;
   a table of material properties; and
   a strength-to-hardness conversion table.

7. The method of claim 1 wherein the plurality of induction heaters are arranged in parallel with each other, and wherein the step of induction heating is performed simultaneously on a plurality of parts.

8. The method of claim 1 wherein the plurality of induction heaters are arranged in series, and wherein the step of induction heating is performed by sequentially and incrementally heating the part.

9. The method of claim 1 further comprising:
   determining a temperature distribution of the part following a hot stamping operation and prior to induction heating.

10. A method of treating a press hardened part comprising:
    monitoring an ambient temperature, system inputs including cycle time and outgoing part property requirements, outgoing part hardness in local areas, and at least one table of material properties;
    setting a time value and temperature value for a plurality of induction heaters;
    induction heating a local area of the part;
    determining outgoing part hardness of the local area of the part after induction heating; and
    measuring a material property of a part during induction heating to obtain a real-time in process temperature distribution data; and
    providing the real-time in process temperature distribution data to a computer system that controls the time value and temperature value for the induction heaters for a subsequent part.

11. The method of claim 10 further comprising:
    determining a temperature distribution of the part following induction heating.

12. The method of claim 10 further comprising:
    imaging the part thermally following induction heating.

13. The method of claim 10 further comprising:
    imaging the part thermally following a hot stamping operation and prior to induction heating.

14. The method of claim 10 wherein the at least one table of material properties includes:
    a table of tempering curves;
    a table of material properties; and
    a strength-to-hardness conversion table.

15. The method of claim 10 wherein the plurality of induction heaters are arranged in parallel with each other, and wherein the step of induction heating is performed simultaneously on a plurality of parts.

16. The method of claim 10 wherein the plurality of induction heaters are arranged in series, and wherein the step of induction heating is performed by sequentially and incrementally heating the part.

* * * * *